(12) United States Patent
Markusson et al.

(10) Patent No.: US 8,942,862 B2
(45) Date of Patent: Jan. 27, 2015

(54) METHOD AND SYSTEM FOR GUIDING A ROBOTIC GARDEN TOOL TO A PREDETERMINED POSITION

(75) Inventors: Olle Markusson, Bankeryd (SE);
Gunnar Andersson, Forserum (SE);
Johan Adolfsson, Jönköping (SE);
Patrick Pettersson, Aneby (SE); Johan Öster, Huskvarna (SE); Patrik Jägenstedt, Tenhult (SE)

(73) Assignee: Husqvarna AB, Huskvarna (SE)

( * ) Notice: Subject to any disclaimer, the term of this patent is extended or adjusted under 35 U.S.C. 154(b) by 215 days.

(21) Appl. No.: 13/635,459

(22) PCT Filed: Mar. 17, 2010

(86) PCT No.: PCT/SE2010/050297
§ 371 (c)(1),
(2), (4) Date: Nov. 27, 2012

(87) PCT Pub. No.: WO2011/115535
PCT Pub. Date: Sep. 22, 2011

(65) Prior Publication Data
US 2013/0066484 A1 Mar. 14, 2013

(51) Int. Cl.
*A01D 34/71* (2006.01)
*G05D 1/02* (2006.01)

(52) U.S. Cl.
USPC .............. 701/2; 701/24; 701/26; 700/245

(58) Field of Classification Search
USPC .............. 701/2, 23, 24, 25, 26, 22; 700/245; 56/10.2; 318/568.12
See application file for complete search history.

(56) References Cited

U.S. PATENT DOCUMENTS

| | | | |
|---|---|---|---|
| 4,679,152 A | 7/1987 | Perdue | |
| 6,009,358 A * | 12/1999 | Angott et al. | 701/25 |
| 6,465,982 B1 | 10/2002 | Bergvall et al. | |
| 7,133,746 B2 * | 11/2006 | Abramson et al. | 700/259 |
| 7,397,213 B2 * | 7/2008 | Im et al. | 318/568.12 |
| 2004/0158354 A1 * | 8/2004 | Lee et al. | 700/245 |
| 2006/0087273 A1 * | 4/2006 | Ko et al. | 318/568.12 |
| 2007/0142964 A1 | 6/2007 | Abramson | |
| 2008/0183349 A1 | 7/2008 | Abramson et al. | |
| 2009/0183478 A1 * | 7/2009 | Bernini | 56/10.2 A |

OTHER PUBLICATIONS

International Search Report and Written Opinion of PCT/SE2010/050297 mailed Dec. 2, 2010.
Chapter I International Preliminary Report on Patentability of PCT/SE2010/050297 mailed Sep. 18, 2012.
"Robotic Lawn Mower," printed from http://www.robolawnmower.com.

* cited by examiner

*Primary Examiner* — Tan Q Nguyen
(74) *Attorney, Agent, or Firm* — Nelson Mullins Riley & Scarborough LLP

(57) ABSTRACT

The present invention relates to a method (400) and a system (100) for guiding a robotic garden tool to a predetermined position. The robotic garden tool includes a control unit (104) and a sensor unit (102) to detect guiding signals. The sensor unit (102) detects a first guiding signal (110) from a first signal source (106) and the robotic garden tool follows the first guiding signal (110) at a variable distance from the first signal source (106) towards the predetermined position. While within a predetermined distance (D) from the predetermined position, the sensor unit (102) detects a second guiding signal (112) from a second signal source (108). Within the predetermined distance (D), the robotic garden tool follows one of the first and the second guiding signals (110 or 112) towards the predetermined position at a preconfigured distance from the corresponding signal source.

19 Claims, 4 Drawing Sheets

METHOD AND SYSTEM FOR GUIDING A ROBOTIC GARDEN TOOL TO A PREDETERMINED POSITION

TECHNICAL FIELD

The present invention relates to a robotic garden tool. In particular, the present invention relates to methods and systems for guiding a robotic garden tool to a charging station.

BACKGROUND

The robotic garden tools, for example, but not limited to, robotic lawnmowers are widely used for grass cutting applications in a lawn. Typically, a robotic lawnmower is an autonomous robotic tool and uses a battery as the power source. Based on the operating load and duration, there is a need to recharge the battery of the robotic lawnmower periodically. As an autonomous robotic lawnmower work unattended, it is required to find a path to a charging station in case the battery power level falls below a threshold power level during operation.

There are many techniques which are currently used to find a path to the charging station. Firstly, an antenna built on the charging station may be used to navigate the robotic lawnmower to the charging station. However, the antenna may have a limited range in a vicinity of the charging station and thus, there is a possibility that the robotic lawnmower is may take long time to find the antenna signals. Another limitation is the complexity in manufacturing the antenna in a close proximity of a charging plate. This may increase the cost of charging plate and thus, the overall cost of the system may also increase.

Another technique employed for overcoming the above mentioned disadvantage is that the robotic lawn mower may follow one or more guide wires or a boundary wire to reach the charging station. However, the robotic mower may follow a same path each time and this may result in undesirable permanent tracks and/or makings on the lawn.

Another technique to find the path to the charging station may use a global positioning system (GPS), but such system has complexity of integrating the GPS system to the robotic lawnmower. Apart from that, the GPS system is expensive and difficult to install, which in turn may add to the overall cost of the robotic lawnmower. Alternatively, a local positioning system, which uses local services such as Wi-Fi or a cellular network, may be utilized. In this case, the robotic garden tool has accurate positioning data but has added limitations of circuits and interfaces which are needed to be added to the system, which may again increase the cost as well as complexity of the entire system.

In light of the foregoing, there is a need for an improved method and system to find a path to a charging station, which will overcome the disadvantages of complex integration, increased cost and permanent tracks on the grass surface.

SUMMARY

In view of the above, it is an objective to solve or at least reduce the problems discussed above. In particular, an objective is to provide methods and system to find a path to a charging station to avoid permanent tracks on the grass surface as well as keeping the related circuitry simple and cost effective.

The objective is achieved by a novel method for guiding a robotic garden tool to a predetermined position as described in claim 1. The robotic garden tool may comprise a control unit and at least one sensor unit. The method may comprise a step of detecting a first guiding signal from a first signal source by the sensor unit. Further, in response to a command from the control unit, the method may comprise the step of following the first guiding signal at a variable distance from the first signal source. The movement of the robotic garden tool at the variable distance from the first signal source may help to avoid any permanent tracks on the grass. Moreover, when the robotic garden tool reaches at a predetermined distance from the predetermined position, the method may comprise a step of detecting a second guiding signal implying that it is close to the predetermined position. Finally, within the predetermined distance from the predetermined position, the method may comprise the step of following one of the first guiding signal or the second guiding signal at a pre-configured distance from the corresponding signal source towards the predetermined position.

According to claims 2 and 3, the first guiding signal source may be a first guide wire, and the method may include detecting the first guiding signal from the first guide wire. Further, the method may include following the first guiding signal at the variable distance from the first guide wire. By following the wire at a variable distance, no traces are made in the lawn by the garden tool.

According to claims 4 and 5, the second signal source may be a second guide wire, and the method may include detecting the second guiding signal from a second guide wire within the predetermined distance from the predetermined position. Further, the method may include moving the robotic garden tool at a pre-configured distance from one of the first guide wire or the second guide wire based on a command from the control unit in response to one of the first and the second guiding signals, when the robotic garden tool is within the predetermined distance from the predetermined position. When both signal sources are guiding wires, and a lawn is provided with two guide wires, each of the two wires in the lawn may act as the first or the second guide wire. It does not matter which of the two wires the robotic garden tool starts to follow when moving towards the predetermined position. The guide wire that the garden tool starts to follow may act as the first guide wire, and the other guide wire may then act as the second guide wire.

Alternatively according to claim 6, the second guiding signal may be generated from the predetermined position. Further, the method may in one embodiment include detecting the second guiding signal within the predetermined distance from the predetermined position from an antenna at the predetermined position. In this case, the method may also include moving the robotic garden tool towards the predetermined position, at the pre-configured distance from the first guide wire based on a command from the control unit in response to one of the first and the second guiding signals. This arrangement may be particularly helpful for a simpler construction and cost effective manufacturing of the charging station.

According to claims 9, the predetermined distance may be in a range of about 0.5 meters to about 4 meters from the predetermined position. The range of the predetermined distance may in one embodiment be determined based on the positioning of the first and second signal sources in form of guide wires adjacent to the predetermined position. In another embodiment, the range of the predetermined distance may be determined based on the range of the antenna at the predetermined position.

Further, according to claim 10, a charging station may be provided at the predetermined position. The guide wires may then be used for guiding the robotic garden tool to the charging station when the garden tool needs to be charged. The command from the control unit may be based on fact that the robotic garden tool needs to be charged.

Claim 11 describes a system for implementing the above mentioned method. The system may comprise a control unit and at least one sensor unit. The control unit may be embodied in the robotic garden tool for guiding the robotic garden tool to the predetermined position. Further, the sensor unit may be adapted to detect the first guiding signal and the second guiding signal from a first signal source and a second signal source respectively.

According to the system, the robotic garden tool may be adapted to follow the first guiding signal at a variable distance from the first signal source towards the predetermined position in response to a command from the control unit. Further, the robotic garden tool may be adapted to, while within the predetermined distance from the predetermined position, follow one of the first and second guiding signals at a preconfigured distance from the corresponding signal source to the predetermined position in response to the command from the control unit.

According to claims 12 and 13, the system may include a first guide wire as the first signal source and a second guide wire as the second signal source. According to claim 14, the first guide wire and the second guide wire may be placed together within the predetermined distance from the predetermined position.

Alternatively, according to claim 15, the second signal source may be mounted at the predetermined position. Further, according to claim 16, the second signal source may be an antenna mounted at the predetermined position.

According to claim 17 the predetermined distance may be in a range from about 0.5 meters to about 4 meters from the predetermined position. Further, according to claim 18, a charging station may be positioned at the predetermined position. Further, according to claim 19, the robotic garden tool may be a battery powered autonomous robotic lawnmower.

BRIEF DESCRIPTION OF THE DRAWINGS

The invention will in the following be described in more detail with reference to the enclosed drawings, wherein.

DESCRIPTION OF EMBODIMENTS

Figure 1:
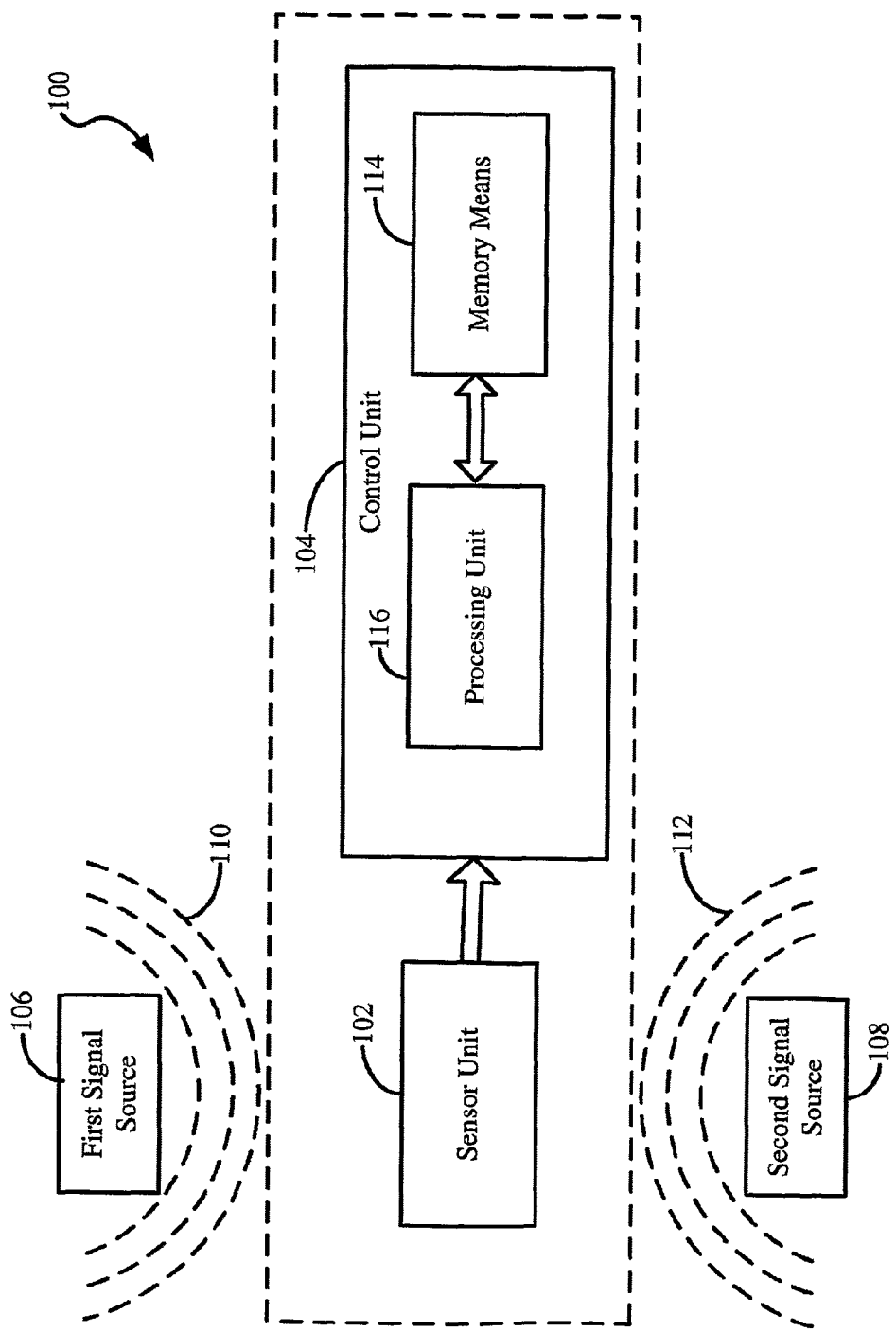
FIG. 1 illustrates a block diagram of a system for guiding a robotic garden tool to a predetermined position, according to an embodiment of the present invention.

The present invention will be described more fully hereinafter with reference to the accompanying drawings, in which example embodiments of the invention incorporating one or more aspects of the present invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. For example, one or more aspects of the present invention can be utilized in other embodiments and even other types of devices. In the drawings, like numbers refer to like elements.

FIG. 1 illustrates a block diagram of a system 100, according to an embodiment of the present invention. In an embodiment of the present invention, the system 100 may be embodied in a battery powered robotic garden tool for guiding the robotic garden tool to a predetermined position. In an embodiment of the present invention, the robotic garden tool may be a battery powered robotic lawnmower used in gardening applications and the system 100 may used for guiding the robotic lawnmower to a charging station. However, the system 100 may also be embodied in any another equipment, for example, a battery powered automated vacuum cleaner or any other autonomous battery powered robotic tool without departing from the essence of the present invention.

In an embodiment of the present invention, the system 100 includes a sensor unit 102 and a control unit 104. During the operation of the robotic garden tool, the sensor unit 102 wirelessly detects one or more guiding signals from a first signal source 106 and a second signal source 108. In an embodiment of the present invention, the first signal source 106 is adapted to send a first guiding signal 110 and the second signal source 108 is adapted to send a second guiding signal 112. In case of a special reason, the sensor unit 102 detects the first guiding signal 110 and/or the second guiding signal 112 in response to a command from the control unit 104. The special reason could be that the power level of the battery of the robotic garden tool falls below a threshold power level, a timer interval is reached, an external command is given or the robotic garden tool detects rain. Further, in an embodiment of the present invention, the control unit 104 also generates a command to direct the robotic garden tool towards the predetermined position. In an embodiment of the present invention, the predetermined position is the charging station for the robotic garden tool.

In an embodiment of the present invention, the sensor unit 102 may include one or more sensors, for example, but not limited to, a magnetic field sensor or a current sensor to detect corresponding magnetic field signals or electrical current signals from the first signal source 106 and/or the second signal source 108. The sensors may be positioned at a front potion of the robotic garden tool. In another embodiment of the present invention, the sensors may be positioned at a suitable location on the robotic garden tool. As it may be apparent to a person ordinarily skilled in the art, the sensor unit 102 converts the detected signals 110 and/or 112 form the first signal source 106 and the second signal source 108 to equivalent electrical signals. Further, the sensor unit 102 provides the converted equivalent electric signals to the control unit 104.

The control unit 104 further includes a memory means 114 and a processing unit 116. In an embodiment of the present invention, the memory means 114 may be a Random Access Memory (RAM), Read Only Memory (ROM), flash memory or any suitable storage equipment. The memory means 114 includes various modules for storing operating instructions and other software of the control unit 104. The operating instructions are a set of computer executable instructions for controlling the overall operations of the control unit 104. The memory means 114 also stores a database of parameters required to send a command to the robotic garden tool based on one or more signals received from the sensor unit 102. In an embodiment of the present invention, the parameters may also include geometry of the lawn or field, a strength of the detected signals, types of detected signals etc. The one or more parameters from the memory means 114 are communicated to the processing unit 116.

The processing unit 116 performs all the computations required to guide the robotic garden tool to the predetermined position. The processing unit 116 includes an input/output (I/O) interface (not shown), which is operable for receiving the parameters and the computer executable instructions from the memory means 114. In an embodiment of the present invention, the processing unit 116 also obtains the converted electrical signals from the sensor unit 102 through the I/O interface.

The processing unit 116 also includes a computing module (not shown) to generate a command for guiding the robotic garden tool to the predetermined position. A command directs the robotic garden tool to follow the first guiding signal 110 at a variable distance from the first signal source 106 towards the predetermined position. In another embodiment of the present invention, a command may direct the robotic garden tool to follow one of the first guiding signal 110 and the second guiding signal 112 from the corresponding signal sources 106 and 108, towards the predetermined position. In a further embodiment of the present invention, the computing module may determine additional parameters, such as, but not limited to, distance of the robotic garden tool from the first signal source 106 and/or the second signal source 108.

Further, the processing unit 116 invokes a command from the memory means 114 based on the detected signals 110 and/or 112. The computing module included in the processing unit 116 compares the characteristics of the detected signals 110 and/or 112 with the database stored in the memory means 114 and thus, identify the required command to be invoked from the memory means 114.

Figure 2:
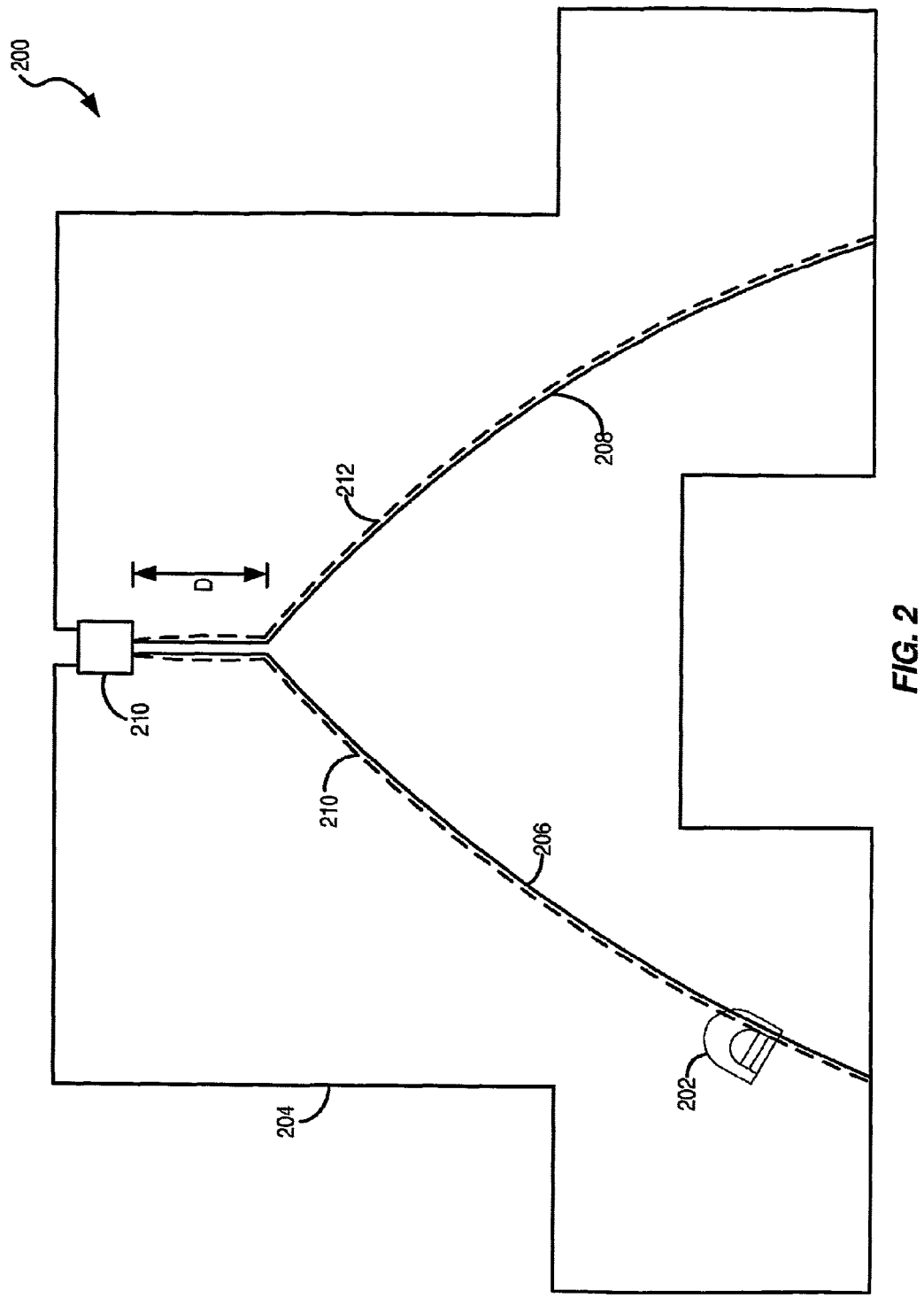
FIG. 2 illustrates a schematic diagram of a guidance system for a robotic garden tool, according to an embodiment of the present invention.

FIG. 2 illustrates a schematic diagram of a guidance system 200 for a robotic lawnmower 202, according to an embodiment of the present invention. The robotic lawnmower 202 acts as the robotic garden tool and is configured to cut vegetation within a limited area. The limited area may be any terrain with vegetation, such as lawns, gardens, yards, golf courses, fields, or the like. In an embodiment of the present invention, the limited area is demarcated by a boundary wire 204. The boundary wire 204 is fixed above the ground or embedded under the ground and connected to a signal generator energized by a power supply or directly connected to the power supply. In an embodiment of the present invention, the boundary wire 204 also forms loops around areas within the limited area where cutting is not desired, for example but not limiting to, fixed objects like garden sheds, trees, walls, large stones, bushes or shrubs, flower or vegetable patches, elevated fountains etc.

The guidance system 200 further includes a first guide wire 206 and a second guide wire 208, wherein the first guide wire 206 and the second guide wire 208 acts as the first signal source 106 and the second signal source 108 respectively. Further, the first guide wire 206 and the second guide wire 208 are adapted to the send the first guiding signal 110 and the second guiding signal 112 respectively. In an embodiment of the present invention, the first guide wire 206 and the second guide wire 208 are also fixed above the ground or embedded under the ground and connected to the boundary wire 204 and a charging station 210. In an embodiment of the present invention, the charging station 210 is located at the predetermined position.

In an embodiment of the present invention, the first guide wire 206 and the second guide wire 208 are placed in substantially parallel configuration within the predetermined distance D from the charging station 210. In an embodiment of the present invention, the predetermined distance D may range from about 0.5 meters to about 4 meters from the charging station 210. In an embodiment of the present invention, beyond the predetermined distance D, the first guide wire 206 and the second guide wire 208 are separate and lie in different directions and are connected to the boundary wire 204 at different locations.

In an embodiment of the present invention, in case the robotic lawnmower 202 experiences a need to charge the battery, or by other reasons should go to the predetermined position, the robotic lawnmower 202 follows the first guiding signal 110 towards the charging station 210. In an embodiment of the present invention, the robotic lawnmower 202 follows the first guiding signal 110 at a variable distance from the first guide wire 206. As described above, when detecting the first guiding signal 110, the control unit 104 generates a command to a driving mechanism of the robotic lawnmower 202 to follow the first guiding signal 110 at a random and/or continuously varying distance from the first guide wire 206. This ensures that the robotic lawnmower 202 not follows the same path each time it follows the first guide wire 206 to reach the charging station 210. Hence, over a large number of working cycles of the robotic lawnmower 202, any permanent marks and/or tracks on lawns due to wheels may be avoided. In another embodiment of the present invention, the robotic lawnmower 202 follows the second guiding signal 112 at a variable distance from the second guide wire 208. In yet another embodiment of the present invention, the robotic lawnmower 202 may also partially follow the boundary wire 204 to locate the charging station 210.

In an embodiment of the present invention, by following the first guide wire 206, when the robotic lawnmower 202 reaches at the predetermined distance D from the charging station 210, the sensor unit 102 also detects the second guiding signal 112 generated by the second guide wire 208. As described above, on detecting the second guiding signal 112, the control unit 104 generates a command to a driving mechanism of the robotic lawnmower 202 to follow one of the first guiding signal 110 or the second guiding signal 112 from the first guide wire 206 and the second guide wire 208 respectively. Further, in an embodiment of the present invention, the robotic lawnmower 202 is directed towards the charging station 210 by following the first guiding signal 110 or the second guiding signal 112 and also moving at a fixed, predetermined, distance from the first guide wire 206 or the second guide wire 208 respectively. In another embodiment of the present invention, the robotic lawnmower 202 straddles over the first guide wire 206 and/or the second guide wire 208 and deck to the charging station 210. In various embodiments of the present invention, more than two guide wires may also be used in order to cover larger cutting areas. This may be particularly helpful to find at least one of the guide wires faster.

Further, as the robotic lawnmower 202 takes a fixed path, while within the predetermined distance D from the charging station 210, the robotic lawnmower 202 may cause permanent tracks on the lawn. To avoid this, a protective plate (not shown) is laid over the lawn. The protective plate may be made up of materials like, but not limited to, different plastic composition, metal alloys and the like.

Figure 3:
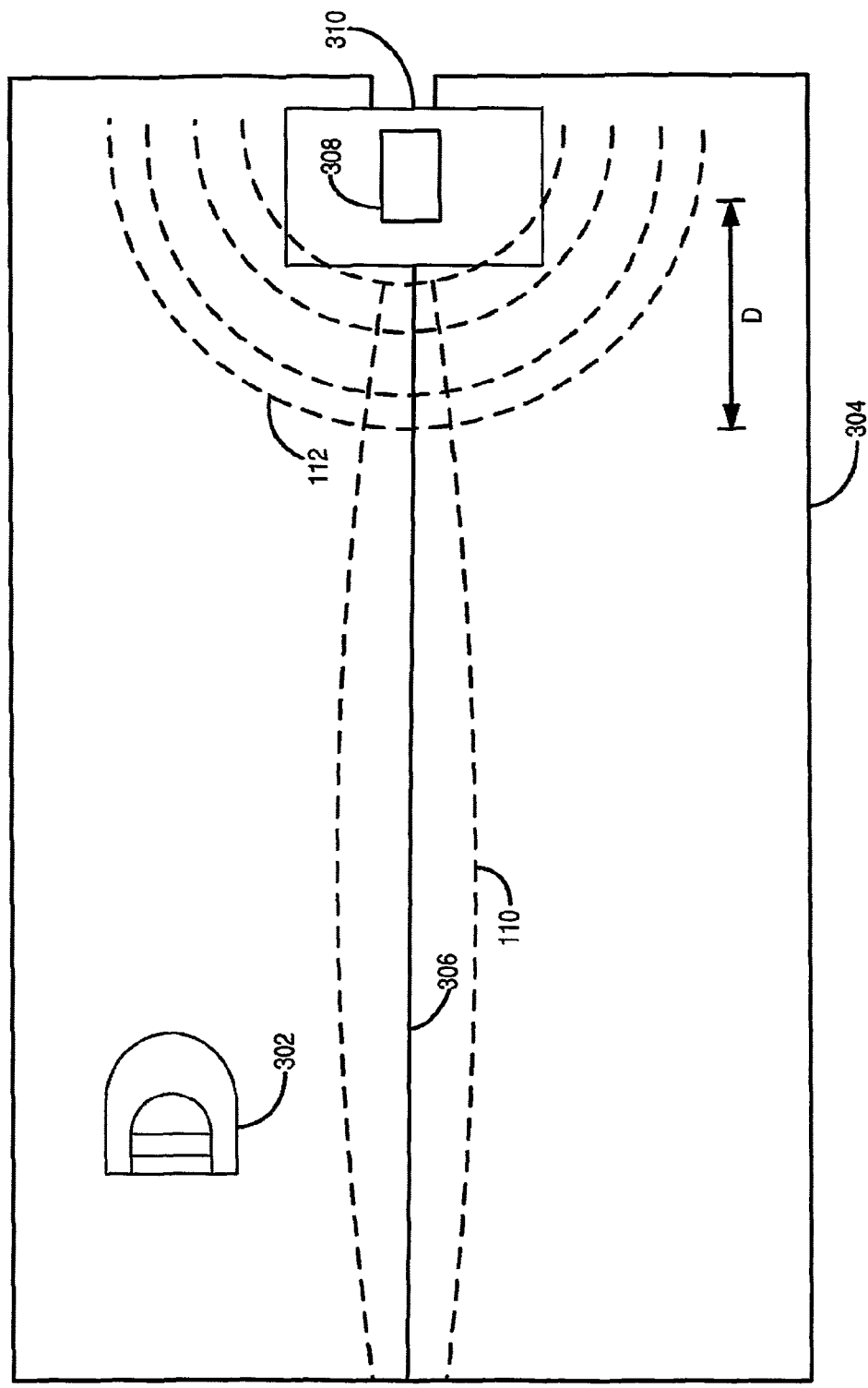
FIG. 3 illustrates a schematic diagram of a guidance system for a robotic garden tool, according to another embodiment of the present invention.

FIG. 3 illustrates schematic diagram of a guidance system 300 for a robotic lawnmower 302, according to another embodiment of the present invention. The guidance system 300 includes a boundary wire 304, a guide wire 306 and an antenna 308. The guide wire 306 acts as the first signal source 106 and adapted to send the first guiding signal 110. The antenna 308 acts as the second signal source 108 and adapted to send the second guiding signal 112. Further, in an embodiment of the present invention, one end of the guide wire 306 is connected to the boundary wire 304, while the other end is connected to a charging station 310. Moreover, the antenna 308 is mounted on the charging station 310 and the second guiding signal 112 may be one of, but not limited to, ultrasonic signal, infrared signal, electromagnetic signal and the likes.

In an embodiment of the present invention, in case the robotic lawnmower 302 experiences a need to charge the battery, or by other reasons should go to the predetermined position, the robotic lawnmower 302 follows the first guiding signal 110 towards the charging station 310. In an embodiment of the present invention, the robotic lawnmower 302 follows the first guiding signal 110 at a variable distance from the guide wire 306.

In an embodiment of the present invention, by following the guide wire 306, when the robotic lawnmower 302 reaches at the predetermined distance D from the charging station 310, the sensor unit 102 mounted on the robotic lawnmower 302 also detects the second guiding signal 112 generated by the antenna 308. As described above, on detecting the second guiding signal 112, the control unit 104 generates a command to a driving mechanism of the robotic lawnmower 302 to follow one of the first guiding signal 110 or the second guiding signal 112 from the guide wire 306 and the antenna 308 respectively. Further, in an embodiment of the present invention, the robotic lawnmower 302 is directed towards the charging station 310 by following the first guiding signal 110 or the second guiding signal 112 and also moving at a fixed distance from the guide wire 306. In another embodiment of the present invention, the robotic lawnmower 302 straddles over the guide wire 306 and deck to the charging station 310. In an embodiment of the present invention, to avoid any permanent tracks on the grass surface a protective plate may also be used.

Further, in an exemplary embodiment of the present invention, the predetermined distance D may range from about 0.5 meters to about 4 meters from the predetermined position. Moreover, in an embodiment of the present invention, the predetermined distance D may be defined by the second guiding signal 112 from the antenna 308. The guidance system 300 particularly eliminates the need for complex process of fabricating large range antennas along with the charging plates. This reduces the cost of the charging plates as well as the overall cost of the guidance system is low. In an exemplary embodiment of the present invention, the range of the antenna 308 may extend to about 8 meters.

Figure 4:
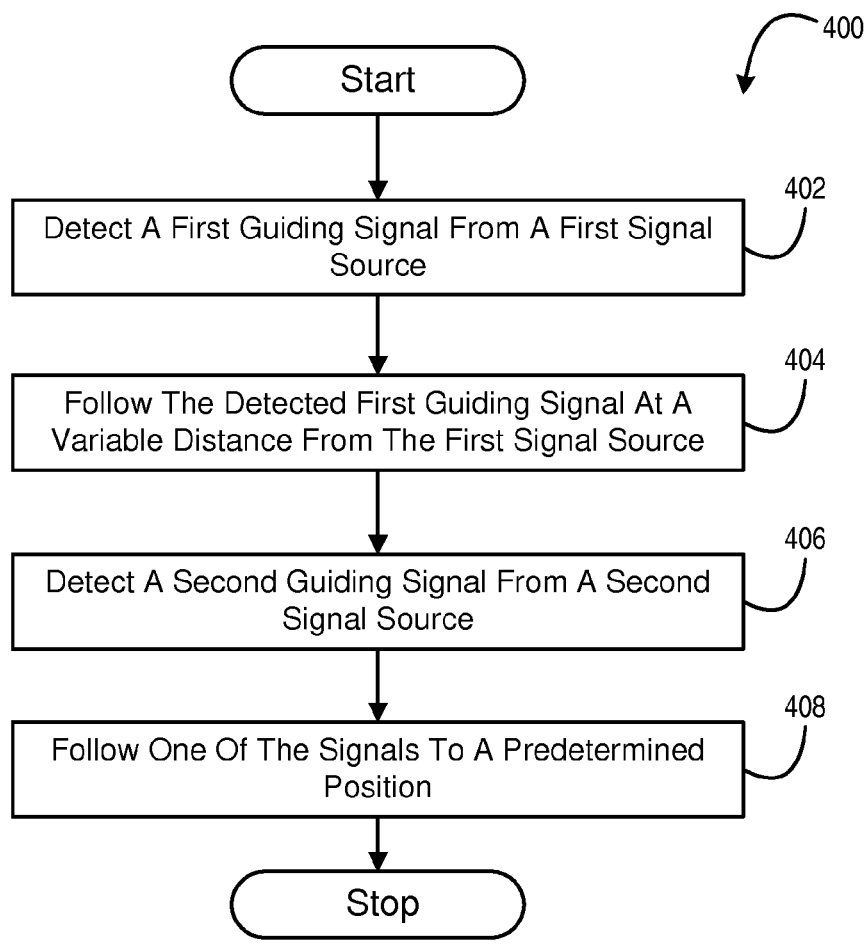
FIG. 4 illustrates a flow chart of an exemplary method for guiding a robotic garden tool to a predetermined position, according to an embodiment of the present invention.

FIG. 4 illustrates a flow chart of a method 400 for guiding a robotic garden tool to a predetermined position, according to an embodiment of the present invention. In step 402 of the method 400, the robotic garden tool detects the first guiding signal 110. As described above, the sensor unit 102 mounted on the robotic garden tool detects the first guiding signal 110. The first guiding signal 110 may for example be, a magnetic field or an electric current. Further, the first guiding signal 110 may have a particular characteristic, for example, but not limited to frequency, phase and strength.

Following the step 402, at step 404 the robotic gardening tool follows the first guiding signal 110 at the variable distance from the first signal source 106. In various other embodiments the first guide wire 206 or the guide wire 306 is used to send the first guiding signal 110. As described above, the control unit 104 generates a command in response to the detected first guiding signal 110 to guide the robotic garden tool towards the predetermined position. The command directs the driving mechanism to continuously or randomly vary the distance from the first signal source for example the guide wires 206 and 306.

Further, in step 406 of the method 400, the robotic garden tool detects the second guiding signal 112. In an embodiment of the present invention, the second guiding signal 112 has its own particular characteristic to distinguish it from the first guiding signal 110. In an embodiment of the present invention, the second guiding signal 112 is detected from the second guide wire 208. In another embodiment of the invention, the second guiding signal 112 is detected within the predetermined distance D from the predetermined position. In various embodiments of the present invention, the antenna 308 is mounted on the predetermined position and is adapted to send the second guiding signal 112.

As described above, the robotic garden tool detects the second guiding signal 112 within the predetermined distance D from the predetermined position. In step 408, in an embodiment of the present invention, the robotic garden tool follows one of the first guiding signal 110 or the second guiding signal 112 towards the predetermined position. In an embodiment of the present invention, within the predetermined distance D, the robotic garden tool moves at a pre-configured distance from one of the guide wires 206 or 306. In another embodiment the robotic garden tool straddles over the one of the guide wires 206 or 306. In yet another embodiment, the robotic garden tool follows a fixed path at a fixed distance next to one of the guide wires 206 or 306.

Though the above mentioned invention explains the working with respect to robotic garden tool, a person skilled in the art may know that such a system may be easily implemented on other tools like, but not limited to, automated vacuum cleaners.

In the drawings and specification, there have been disclosed preferred embodiments and examples of the invention and, although specific terms are employed, they are used in a generic and descriptive sense only and not for the purpose of limitation, the scope of the invention being set forth in the following claims.

The invention claimed is:

1. A method for guiding a robotic garden tool to a predetermined position, wherein the robotic garden tool comprising a control unit and at least one sensor unit for wirelessly detecting guiding signals, the method comprises the steps of:
   detecting a first guiding signal from a first signal source;
   following the first guiding signal at a variable distance from the first signal source towards the predetermined position in response to a command from the control unit;
   detecting a second guiding signal from a second signal source, wherein the second guiding signal is detected within a predetermined distance from the predetermined position; and
   following one of the first and the second guiding signals at a pre-configured distance from the corresponding signal source towards the predetermined position.

2. A method according to claim 1, wherein detecting the first guiding signal from the first signal source comprises the step of detecting the first guiding signal from a first guide wire.

3. A method according to claim 2, wherein following the first guiding signal comprises the step of moving the robotic garden tool along the first guide wire at the variable distance from the first guide wire.

4. A method according to claim 1, wherein detecting the second guiding signal comprises the step of detecting the second guiding signal from a second guide wire within the predetermined distance from the predetermined position.

5. A method according to claim 4, wherein following one of the first and the second guiding signals comprises the step of moving the robotic garden tool at a pre-configured distance from one of the first guide wire or the second guide wire based on a command from the control unit in response to one of the first and the second guiding signals.

6. A method according to claim 1, wherein the second signal source is located at the predetermined position.

7. A method according to claim 6, wherein detecting the second guiding signal within the predetermined distance comprises the step of detecting the second guiding signal from an antenna mounted at the predetermined position.

8. A method according to claim 6, wherein following one of the first and the second guiding signals comprises moving the robotic garden tool at a pre-configured distance from a first guide wire based on a command from the control unit in response to one of the first and the second guiding signals.

9. A method according to claim 1, wherein the predetermined distance is in a range from about 0.5 meters to about 4 meters from the predetermined position.

10. A method according to claim 1, providing a charging station at the predetermined position.

11. A system for guiding a robotic garden tool to a predetermined position, the system comprising
 a first signal source, configured to send a first guiding signal for guiding the robotic garden tool towards the predetermined position;
 a second signal source, configured to send a second guiding signal for guiding the robotic garden tool towards the predetermined position;
 at least one sensor unit provided on the robotic garden tool to detect the first guiding signal and the second guiding signal; and
 a control unit provided on the robotic garden tool to generate a command based in response to at least one of the first guiding signal and the second guiding signal;
 wherein the robotic garden tool is configured to follow the first guiding signal at a variable distance from the first signal source towards the predetermined position in response to the command from the control unit; and
 the robotic garden tool is further configured to, when within a predetermined distance from the predetermined position, follow one of the first and second guiding signals at a pre-configured distance from the corresponding signal source to the predetermined position in response to the command from the control unit.

12. A system according to claim 11, wherein the first signal source is a first guide wire.

13. A system according to claim 11, wherein the second signal source is a second guide wire.

14. A system according to claim 11, wherein the first signal source and the second signal source are placed together within the predetermined distance from the predetermined position and then oriented in different directions.

15. A system according to claim 11, wherein the second signal source is mounted at the predetermined position.

16. A system according to claim 15, wherein the second signal source is an antenna mounted at the predetermined position.

17. A system according to claim 11, wherein the predetermined distance is in a range from about 0.5 meters to about 4 meters from the predetermined position.

18. A system according to claim 11, wherein the predetermined position is the position of a charging station.

19. A system according to claim 11, wherein the robotic garden tool is a robotic lawnmower.

\* \* \* \* \*